Aug. 19, 1924.
R. L. FAY
TIRE HEATER
Filed Sept. 5, 1922
1,505,548
2 Sheets-Sheet 2
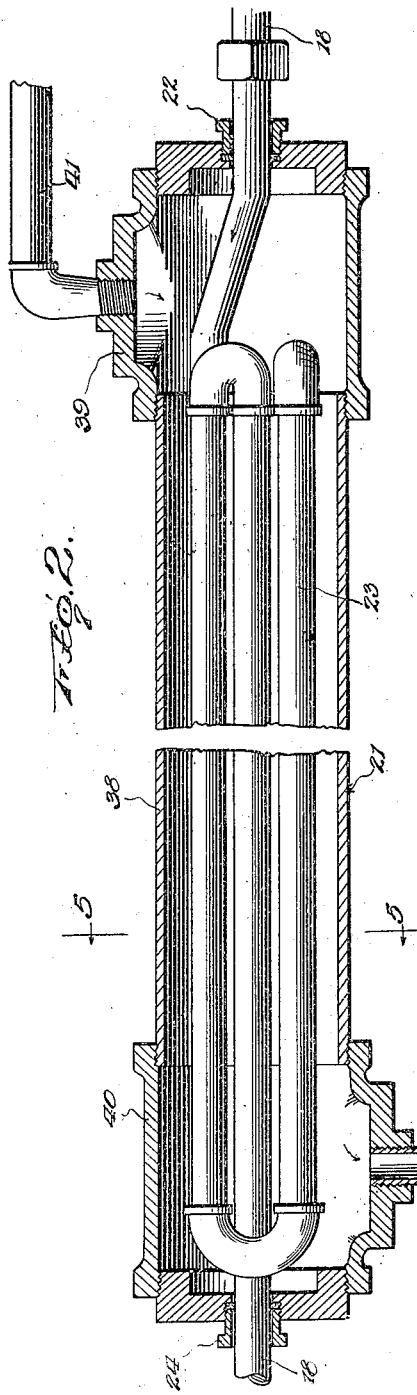
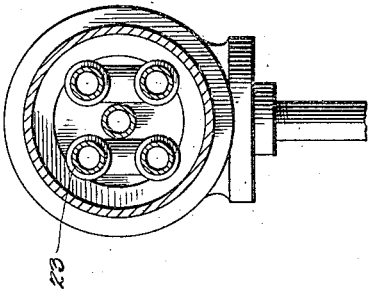
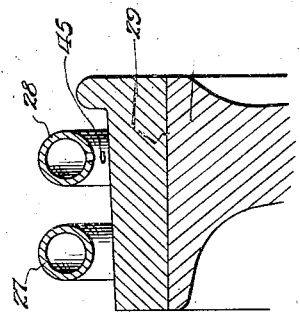
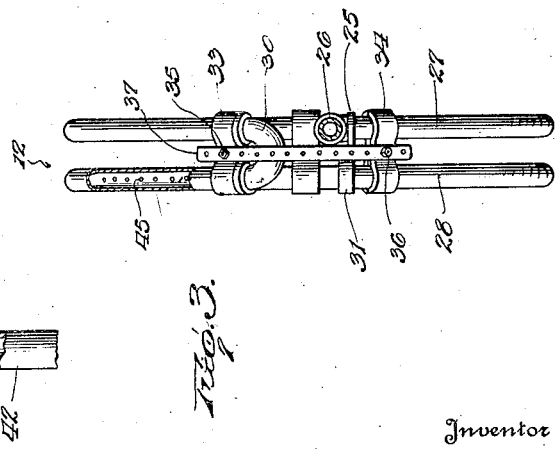
Inventor
Raymond L. Fay.
By Lacey & Lacey, Attorneys Patented Aug. 19, 1924.

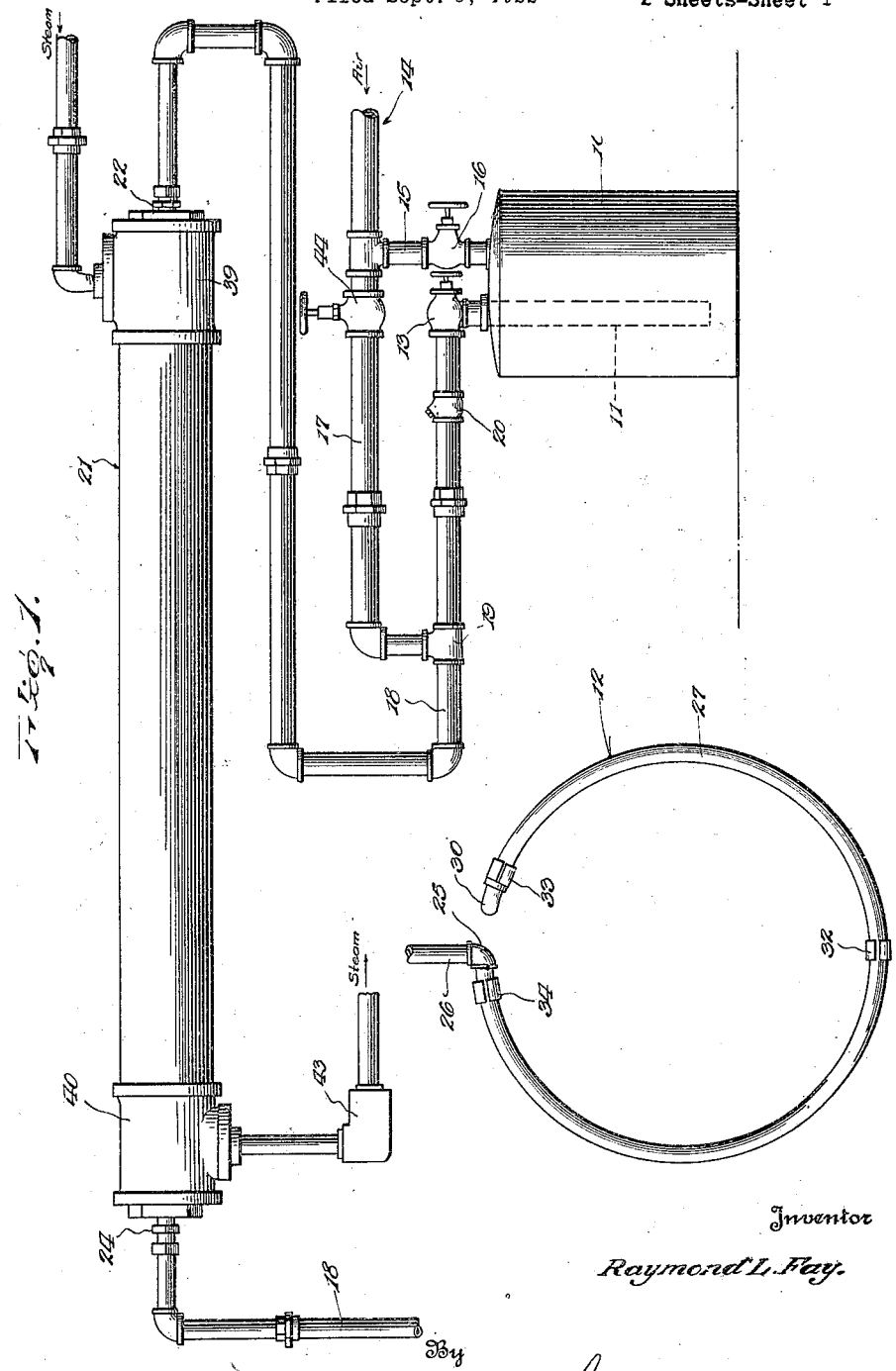

1,505,548

UNITED STATES PATENT OFFICE.

RAYMOND L. FAY, OF PHILLIPSBURG, NEW JERSEY.

TIRE HEATER.

Application filed September 5, 1922. Serial No. 586,241.

*To all whom it may concern:*

Be it known that I, RAYMOND L. FAY, citizen of the United States, residing at Phillipsburg, in the county of Warren and State of New Jersey, have invented certain new and useful Improvements in Tire Heaters, of which the following is a specification.

This invention relates to heating apparatuses, more particularly applicable to the heating of metal tires for wheels, such as locomotive drive wheels and the like. The main object of the invention is to provide a device of this class, that will uniformly heat the tire throughout to cause sufficient expansion to enable the tire to be applied to the body or the hub of a wheel and subsequently shrinking the tire thereon.

Another object of the invention is to furnish a preheating system for the fuel used in the heater. Still another object is to furnish apparatus for mixing the fuel with air to obtain the proper consistency and to force the fuel mixture into the burner at the required pressure.

In the accompanying drawings one embodiment of the invention is illustrated, and Fig. 1 shows an assembled view of the heater in side elevation;

Fig. 2 is a longitudinal section of a steam chamber used in connection with the heater;

Fig. 3 is a side view of the heating hoops;

Fig. 4 is a fragmentary section indicating the application of the hoops around a wheel tire, and Fig. 5 is a transverse section along line 5—5 of Fig. 2.

In the drawings reference numeral 10 represents a fuel tank, the fuel preferably being oil of any kind whether of high or low grade. A pipe 11 extends from the top of the tank to near its bottom and is intended to convey the oil from the tank to the burner or hoops 12. Near the top of the tank 10, this pipe is provided with a needle valve 13 intended to control the supply of oil from the tank 10.

From a compressed air line 14 a branch 15 opens into the top of the tank 10 and on this branch another globe valve 16 controls the air inlet from line 14 and the air pressure in the tank intended to force the oil up through pipe 11. Another branch 17 of the air line opens into the conduit 18 for the oil a short distance from the oil valve 13. Between the same and the T 19, connecting the branch with the conduit 18 is inserted a check valve 20 preventing the return of the oil from the conduit 18 into the tank 10. The branch 17 of the air line contains a globe valve 44, which is intended to control the air supply for the fuel mixture.

The conduit 18 opens into a steam chamber 21 through a packing box 22 in one end thereof and the conduit 18 forms a circuitous passage through the steam chamber by means of coils 23 running back and forth within the chamber and finally leaving the latter through another packing box 24 at the opposite end of the steam chamber 21. It will be evident that depending on conditions, a different number of coils 23 may be furnished. As seen in Figs. 2 and 5, these coils 23 consist of five lengths of pipe running back and forth within the steam chamber 21.

From the packing box 24 the conduit 18 continues to the actual tire heater or burner 12, where it joins the latter by means of an elbow 25 as at 26. This heater consists of two parallel hoops 27 and 28 of which the hoop 27 connects with the elbow 25 and continues in a substantially complete circle slightly larger in diameter than the outside diameter of the tire 29, which is intended to be heated. The hood 27 has a standard bend 30 connecting it with the other annular hoop 28 of the same diameter, the opposite end of which is closed by means of a plug 31. The hoop 28 is on its inner side provided with radially directed perforations 45, through which the lighted fuel escapes to heat the tire.

Midway between the ends of the hoops as at 32 is provided a spacing and clamping band, which is intended to keep the hoops 27 and 28 at a predetermined distance apart. Similar bands 33 and 34 are also provided near the ends of the hoops to keep them at uniform distance at these places. Each of these bands 33 and 34 have bolts 35 and 36 running throupgh the same, which are intended to engage a strap 37 and in this manner determine the diameter of the coils, when positioned around the tire 29. It will thus be seen that by drawing the ends of the coils closer together and attaching the strap 37, the diameter of the coils may be diminished to suit a small tire.

The steam chamber 21 consists of a straight central tube 38, the ends of which are threaded into the respective pipe T's 39 and 40 which at their outer ends carry the packing boxes 22 and 24 already described. A steam pipe 41 opens into the side of pipe T 39 for admitting steam and similarly an outlet pipe 42 opens into the pipe T 40 for the exhaust steam from the steam chamber 21. This latter pipe 42 is preferably provided with a steam trap 43.

It should be noted that only hoop 28 of the tire heater is provided with perforations 45 and that the other hoop 27 has no such perforations. It will thus be seen that the fuel mixture entering hoop 27 through the elbow 25 will circulate in this hoop and then enter the hoop 28 through the bend 30 and that no escape of the gas is possible in hoop 27 but only through the perforations 45 in the hoop 28, these perforations forming the gas jets throwing the flames against the tire. A practical construction of the heater has been found to be made from ¾ inch standard pipe for the hoops with perforations of ⅛ of an inch to $\frac{5}{32}$ of an inch in the hoop 28, while the conduit 18 together with the coils in steam chamber 21 are also of one inch diameter and the tube 38 consists of a standard steam pipe six inches in diameter.

The apparatus is used in the following manner:

With the oil tank 10 filled with suitable oil the valve 16 is opened to furnish air pressure for delivering the oil into the pipe 11 and conduit 18. By opening valves 13 and 44 suitable fuel mixture will be produced of oil and air, which are mixed at the T 19, where they meet in the conduit. Simultaneously, steam has been let into the steam chamber 21 from the steam pipe 41 so that the chamber is now well heated and the fuel mixture passing back and forth in the steam chamber through the coils 23 will in this manner be suitably preheated and atomized previously to reaching the tire heater 12. At first both hoops 27 and 28 will be cold in case the heater has not been used for some time, but directly the gas escapes through the perforations 45 in the hoop 28 not only this hoop, but also the unperforated hoop 27, will be heated on account of its nearness to hoop 28, so that when the apparatus is properly running, the fuel will be still more heated when passing through hoop 27. Part of this heat will then be communicated to the outer end of the tire as seen in Fig. 4 while the inner or heavier end of the tire 29 will be exposed to the direct flames around the hoop 28.

This apparatus will burn any kind of oil whether high or low grade which will be atomized after mixing with a suitable amount of air and form the necessary gas to produce an intense heat with a minimum of oil consumption.

Having thus described the invention, what is claimed as new is:

1. An apparatus of the class described comprising open inter-communicating tubular hoops, one of which constitutes a burner and the other of the hoops a superheater, and means for adjusting the diameters of the hoops, a compressed fuel supply, a conduit from said supply to said superheater and a preheater having a steam chamber through which said conduit is led.

2. An apparatus of the class described comprising open inter-communicating tubular hoops, one of which constitutes a burner and the other of the open hoops a superheater, braces between the hoops and means associated with said braces for adjusting the diameters of the hoops, a compressed fuel supply, a conduit from said supply to said superheater, and a preheater through which said conduit is led, said preheater including a steam chamber and said conduit being provided with coils within the steam chamber.

3. An apparatus of the class described comprising open inter-communicating tubular hoops, one of which constitutes a burner and the other of the hoops a superheater, braces between the hoops and means associated with said braces for adjusting the diameters of the hoops, an oil tank, a conduit connecting said tank with said superheater, a compressed air line having a branch opening into said tank, a second branch from said air line opening into said conduit and suitable valves in said branches and said conduit for regulating the pressure in the tank and the proper fuel mixture of oil and air respectively.

4. An apparatus of the class described comprising open inter-communicating tubular hoops, one of which constitutes a burner and the other of the hoops a superheater, braces between the hoops and means associated with said braces for adjusting the diameters of the hoops, an oil tank, a conduit connecting said tank with said superheater, a compressed air line having a branch opening into said tank, a second branch from said air line opening into said conduit and suitable valves in said branches and said conduit for regulating the pressure in the tank and the proper fuel mixture of oil and air respectively, and a preheater through which said conduit is led.

In testimony whereof I affix my signature.

RAYMOND L. FAY. [L. S.]